United States Patent
Min et al.

(10) Patent No.: US 12,030,965 B2
(45) Date of Patent: Jul. 9, 2024

(54) MODIFIED CONJUGATED DIENE BASED POLYMER, MANUFACTURING METHOD THEREOF, BINDER COMPOSITION FOR SOLID PROPELLANT COMPRISING THE SAME, MODIFIED CONJUGATED DIENE BASED BINDER FOR SOLID PROPELLANT, AND MANUFACTURING METHOD THEREOF

(71) Applicant: AGENCY FOR DEFENSE DEVELOPMENT, Daejeon (KR)

(72) Inventors: Byoung Sun Min, Daejeon (KR); Jin Hyuk Lee, Daejeon (KR); Hong Min Shim, Daejeon (KR); Sungjune Kim, Daejeon (KR); Minhye Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 132 days.

(21) Appl. No.: 17/849,485

(22) Filed: Jun. 24, 2022

(65) Prior Publication Data
US 2023/0272131 A1    Aug. 31, 2023

(30) Foreign Application Priority Data
Feb. 25, 2022    (KR) .......................... 10-2022-0024932

(51) Int. Cl.
*C08F 136/14*    (2006.01)
(52) U.S. Cl.
CPC ................................. *C08F 136/14* (2013.01)
(58) Field of Classification Search
CPC ..................................................... C08F 136/14
USPC ........................................................... 524/193
See application file for complete search history.

(56) References Cited

U.S. PATENT DOCUMENTS

| 2011/0077365 A1 | 3/2011 | Yu et al. |
| 2016/0046539 A1 | 2/2016 | Deppert et al. |

FOREIGN PATENT DOCUMENTS

| JP | 6431181 B2 | 11/2018 | |
| KR | 10-2014-0124911 A | 10/2014 | |
| KR | 10-2018-0076641 A | 7/2018 | |
| KR | 10-2021126 B1 | 9/2019 | |
| KR | 10-2052653 B1 | 12/2019 | |
| KR | 2052653 B1 * | 12/2019 | ............ C06B 45/10 |
| KR | 10-2020-0048684 A | 5/2020 | |

OTHER PUBLICATIONS

J. Appl. Polym. Sci., 134(32), 45178, 2017. (Year: 2017).*
Translation of KR 2052653, Dec. 5, 2019. (Year: 2019).*
Korean Notice of Allowance for counterpart Korean Application No. 10-2022-0024932, dated Sep. 29, 2022, 7 pages and partial English translation.
Min, et al., "Cationic Ring-opening Polymerization of Epichlorohydrin Using Hydroxyl-terminated Polybutadiene as an Initiator Followed by the Azidation of the Resulting Block Copolymer," Polymer(Korea), vol. 42, No. 2, 2018, pp. 192-196.

* cited by examiner

*Primary Examiner* — Hui H Chin
(74) *Attorney, Agent, or Firm* — Lewis Roca Rothgerber Christie LLP (57) ABSTRACT

Provided are a modified conjugated diene-based polymer comprising a conjugated diene-based monomer-derived repeating unit; and a chain extender-derived part which is linked to both terminals of the conjugated diene based monomer-derived repeating unit, respectively, includes one or more urethane groups in a molecular chain, and has different functional groups at both terminals, wherein one of the functional groups is an alkyne group, wherein a terminal of the chain extender-derived part which is not linked to both terminals of the conjugated diene based monomer-derived repeating unit is an alkyne group, a manufacturing method thereof, a binder composition for a solid propellant comprising the same, a modified conjugated diene based binder for a solid propellant, and a manufacturing method thereof.

11 Claims, 5 Drawing Sheets

MODIFIED CONJUGATED DIENE BASED POLYMER, MANUFACTURING METHOD THEREOF, BINDER COMPOSITION FOR SOLID PROPELLANT COMPRISING THE SAME, MODIFIED CONJUGATED DIENE BASED BINDER FOR SOLID PROPELLANT, AND MANUFACTURING METHOD THEREOF

CROSS-REFERENCE TO RELATED APPLICATIONS

This application claims the priority of Korean Patent Application No. 10-2022-0024932 filed on Feb. 25, 2022, in the Korean Intellectual Property Office, the disclosure of which is incorporated herein by reference.

BACKGROUND OF THE INVENTION

Field of the Invention

The present disclosure relates to a modified conjugated diene based polymer, a manufacturing method of the modified conjugated diene based polymer, a binder composition for a solid propellant comprising the modified conjugated diene based polymer, a modified conjugated diene based binder for a solid propellant manufactured from the binder composition for the solid propellant, and a manufacturing method of the modified conjugated diene based binder for the solid propellant.

Description of the Related Art

A binder curing system in a conventional solid propellant is formed by a urethane reaction in which molecular chains are cross-linked by a urethane group generated by an organic chemical reaction between a hydroxyl group at the terminal of a polymer chain in a binder and an isocyanate curing agent.

However, an isocyanate compound, which is a cross-linking agent and curing agent in an urethane curing system, is very sensitive to moisture, and thus, a separate moisture saving device needs to be provided to make an external environment in which moisture is blocked as much as possible when a propellant is manufactured.

In addition, the isocyanate compound is very environmentally harmful because it is mainly manufactured under toxic gas called phosgene, and recently, research on a new curing agent to replace isocyanate has been actively conducted.

In addition to the sensitivity to moisture and the environmentally unfriendly manufacturing method of the isocyanate compound, recently, there is a problem of having poor compatibility between the isocyanate compound and an environmentally friendly oxidizing agent such as ammonium dinitramide (ADN) and hydrazinium nitroformate (HNF) instead of an oxidizing agent of a general-purpose solid propellant such as ammonium perchlorate that emits hydrochloric acid gas when the propellant is burned.

As such, in order to overcome the problems to be faced by using the isocyanate compound used when manufacturing a mixed solid propellant, recently, research on a triazole curing system in which molecular chains in the binder of the propellant are cross-linked with a triazole group rather than a urethane group has been conducted.

However, compared to the urethane group in which hydrogen bonds between molecular structures are formed, since the triazole group does not have a mutual attraction between the molecular structures, there is a problem in that mechanical properties such as elongation, tensile strength and elastic modulus of the binder are lowered, and thus, there remain objects to solve this problem.

SUMMARY OF THE INVENTION

An object of the present disclosure is to provide a modified conjugated diene based polymer, a manufacturing method thereof, a binder composition for a solid propellant comprising the same, a modified conjugated diene based binder for a solid propellant, and a manufacturing method thereof capable of applying a triazole curing system which is eco-friendly, less sensitive to moisture, and excellent in compatibility with an eco-friendly oxidizing agent, instead of a urethane curing system, which is a binder curing system in a conventional solid propellant.

Another object of the present disclosure is to improve the mechanical properties of a binder by introducing a urethane group capable of secondary bonding such as hydrogen bonds in a molecular chain before curing of the binder composition for the solid propellant.

The objects to be solved by the present disclosure are not limited to the aforementioned object(s), and other object(s), which are not mentioned above, will be apparent to those skilled in the art from the following description.

According to an aspect of the present disclosure, there is provided a modified conjugated diene-based polymer comprising a conjugated diene-based monomer-derived repeating unit; and a chain extender-derived part which is linked to both terminals of the conjugated diene based monomer-derived repeating unit, respectively, includes one or more urethane groups in a molecular chain, and has different functional groups at both terminals, wherein one of the functional groups is an alkyne group, wherein a terminal of the chain extender-derived part which is not linked to both terminals of the conjugated diene based monomer-derived repeating unit is an alkyne group.

In an embodiment of the present disclosure, the conjugated diene based monomer may include at least one selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene.

In an embodiment of the present disclosure, the molecular weight of the modified conjugated diene based polymer may be 2,000 g/mol to 10,000 g/mol.

In an embodiment of the present disclosure, the chain extender-derived part may be formed from a chain extender having an alkyne group at one terminal and an isocyanate group at the other terminal, and bonded to the isocyanate group of the chain extender by reacting with hydroxyl groups at both terminals of the conjugated diene based monomer-derived repeating unit.

In an embodiment of the present disclosure, the modified conjugated diene based polymer may be represented by the following Chemical Formula 1.

[Chemical Formula 1]

In Chemical Formula 1, $R_1$ is an alkylene group having 1 to 20 carbon atoms or an alkenylene group having 2 to 20 carbon atoms, and $R_2$ is an alkylene group having 1 to 20 carbon atoms, an alkenylene group having 2 to 20 carbon atoms, an isophorone moiety or a toluene moiety.

In an embodiment of the present disclosure, in Chemical Formula 1, $R_1$ is an alkylene group having 1 to 10 carbon atoms, and $R_2$ is an alkylene group having 1 to 10 carbon atoms, an isophorone moiety or a toluene moiety.

According to another aspect of the present disclosure, there is provided a manufacturing method of a modified conjugated diene based polymer comprising steps of: preparing a chain extender which includes one or more urethane groups in a molecular chain and has different functional groups at both terminals, wherein one of the functional groups is an alkyne group (S10); and substituting a terminal of the conjugated diene based polymer with an alkyne group by reacting the chain extender prepared in step S10 with the conjugated diene based polymer including a conjugated diene based monomer-derived repeating unit and having hydroxyl groups at both terminals (S20).

In an embodiment of the present disclosure, one terminal of the chain extender may be an alkyne group, and the other terminal thereof may be an isocyanate group.

In an embodiment of the present disclosure, the chain extender may be represented by the following Chemical Formula 2.

[Chemical Formula 2]

In Chemical Formula 2, $R_1$ is an alkylene group having 1 to 20 carbon atoms or an alkenylene group having 2 to 20 carbon atoms, and $R_2$ is an alkylene group having 1 to 20 carbon atoms, an alkenylene group having 2 to 20 carbon atoms, an isophorone moiety or a toluene moiety.

In an embodiment of the present disclosure, in step S20, the isocyanate group of the chain extender may be urethane-bonded to the hydroxyl groups at both terminals of the conjugated diene based polymer.

According to yet another aspect of the present disclosure, there is provided a modified conjugated diene based binder composition for a solid propellant including the modified conjugated diene based polymer according to the present disclosure; and a curing agent having azide groups at one or more terminals.

In an embodiment of the present disclosure, the curing agent may have azide groups at three terminals.

In an embodiment of the present disclosure, the curing agent may include at least one selected from the group consisting of compounds represented by the following Chemical Formulas 3 and 4.

[Chemical Formula 3]

[Chemical Formula 4]

In Chemical Formula 3, $R_3$ to $R_5$ are each independently an alkylene group having 1 to 20 carbon atoms, an alkenylene group having 2 to 20 carbon atoms, a cycloalkylene group having 3 to 20 carbon atoms, an arylene group having 6 to 20 carbon atoms, or —R—O—R— (R is an alkylene group having 1 to 20 carbon atoms or an alkenylene group having 2 to 20 carbon atoms), and in Chemical Formula 4, $X_1$ to $X_3$ are each independently O or S, and $R_6$ to $R_8$ are each independently an alkylene group having 1 to 20 carbon atoms, an alkenylene group having 2 to 20 carbon atoms, and a cycloalkylene group having 3 to 20 carbon atoms, or an arylene group having 6 to 20 carbon atoms.

In an embodiment of the present disclosure, in Chemical Formula 3, $R_3$ to $R_5$ may be an alkylene group having 1 to 3 carbon atoms or —R—O—R— (R is an alkylene group having 1 to 3 carbon atoms), and in Chemical Formula 4, $X_1$ to $X_3$ may be O, and $R_6$ to $R_8$ may be an alkylene group having 1 to 5 carbon atoms.

In an embodiment of the present disclosure, the modified conjugated diene based binder composition for the solid propellant may further include a plasticizer, wherein the plasticizer may include at least one selected from the group consisting of dioctyl sebacate (DOS), dioctyl adipate (DOA), isodecyl pelargonate (IDP), nitroglycerin (NG), 1,2,4-butanetriol trinitrate (BTTN), diethylene glycol dinitrate (DEGDN), 2-methyl-2-methylol-1,3-propanediol trinitrate (TMETN), triethyleneglycol dinitrate (TEGDN), n-butyl-nitratoethyl nitramine (BuNENA) and diphenylamine (DPA).

In an embodiment of the present disclosure, the modified conjugated diene based binder composition for the solid propellant may include 60 wt % to 85 wt % of the modified conjugated diene based polymer, 2 wt % to 10 wt % of the curing agent, and 10 wt % to 35 wt % of the plasticizer.

According to still another aspect of the present disclosure, there is provided a modified conjugated diene based binder for a solid propellant in which the modified conjugated diene based polymer according to the present disclosure and a curing agent having azide groups at one or more terminals are cross-linked by a triazole-forming reaction.

In an embodiment of the present disclosure, the modified conjugated diene-based polymer and the curing agent having azide groups at one or more terminals are cross-linked by the triazole-forming reaction to form a main chain, and the main chain may include a plasticizer-derived unit.

According to still another aspect of the present disclosure, there is provided a manufacturing method of a modified conjugated diene based binder for a solid propellant including preparing a binder composition by mixing the modified conjugated diene based polymer according to the present disclosure and a curing agent having azide groups at one or more terminals (S100); and cross-linking the binder composition (S200).

According to the present disclosure, it is possible to manufacture a modified conjugated diene based polymer of an alkyne terminal group having a urethane group in a molecular chain by using a chain extender having an alkyne group at one terminal and an isocyanate group at the other terminal, and to provide a binder for a solid propellant by cross-linking the prepared modified conjugated diene based polymer using a curing agent having an azide terminal group.

According to the present disclosure, a urethane reaction system using an isocyanate curing agent is not introduced when manufacturing a binder for a solid propellant in the related art, thereby solving the problems of moisture sensitivity and environmental unfriendliness.

According to the present disclosure, as a type of polymer, the terminal of the conjugated diene based polymer of the hydroxyl terminal group is substituted with an alkyne group and cross-linked with a curing agent having an azide group, thereby solving a risk problem of using an azide curing agent in the form of a single molecule and preventing entanglement during an azide substitution reaction of the hydroxyl group.

According to the present disclosure, when the binder cross-linked by reacting the modified conjugated diene based polymer in which both terminals are modified with alkyne groups and a curing agent having an azide terminal group is applied to the solid propellant, it is possible to improve the energy of the propellant by not only improving mechanical properties, viscoelastic properties and thermal properties, but also applying the high heat of formation of a triazole group, which is a cross-linking point of a binder polymer chain and an eco-friendly/high energy oxidizing agent such as ammonium dinitramide.

DETAILED DESCRIPTION OF THE PREFERRED EMBODIMENT

Before describing the present disclosure in detail, terms or words used in this specification should not be construed as unconditionally limited to a conventional or dictionary meaning, and the inventors of the present disclosure can appropriately define and use the concept of various terms in order to describe their invention in the best method. Furthermore, it should be understood that these terms or words should be interpreted as meanings and concepts consistent with the technical idea of the present disclosure.

That is, the terms used in the present disclosure are only used to describe a preferred embodiment of the present disclosure, and are not intended to specifically limit the contents of the present disclosure, and it should be noted that these terms are terms defined in consideration with various possibilities of the present disclosure.

In addition, in this specification, it should be understood that the singular expression may include a plural expression unless clearly indicated in another meaning in the context, and even if similarly expressed in the plural, the singular expression may include the meaning of the singular number.

Throughout the present disclosure, when a component is described as "including" the other component, the component does not exclude any other component, but may further include any other component unless otherwise indicated in contrary.

In the present disclosure, the terms 'derived repeating unit' and 'derived part' may refer to a component, a structure, or a substance itself derived from a certain substance.

Further, hereinafter, in the following description of the present disclosure, a detailed description of a configuration determined to unnecessarily obscure the subject matter of the present disclosure, for example, known technologies including the related arts may be omitted.

Hereinafter, the present disclosure will be described in more detail with reference to FIGS. 1 to 5.

According to the present disclosure, there is provided a modified conjugated diene based polymer comprising a conjugated diene based monomer-derived repeating unit; and a chain extender-derived part which is linked to both terminals of the conjugated diene based monomer-derived repeating unit, includes one or more urethane groups in a molecular chain, and has different functional groups at both terminals, wherein one of the functional groups is an alkyne group, wherein a terminal of the chain extender-derived part which is not linked to the both terminals of the conjugated diene based monomer-derived repeating unit is an alkyne group.

In an embodiment of the present disclosure, the conjugated diene based monomer may include at least one selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene.

In an embodiment of the present disclosure, the number of the conjugated diene based monomer-derived repeating units in the modified conjugated diene based polymer may be 1 or 2 or more, and as a specific example, the number of the conjugated diene based monomer-derived repeating units in the modified conjugated diene based polymer may be 2.

The modified conjugated diene based polymer may include a first conjugated diene based monomer-derived repeating unit and a second conjugated diene based monomer-derived repeating unit, which are different conjugated diene based monomer-derived repeating units.

In an embodiment of the present disclosure, the first conjugated diene based monomer may be 1,3-butadiene, and the second conjugated diene based monomer may be isoprene. Specifically, when a binder manufactured by including different conjugated diene based monomer-derived repeating units is used for a solid propellant, not only mechanical properties but also thermal properties may be improved. In particular, by using the modified conjugated diene based polymer including the 1,3-butadiene-derived repeating unit and the isoprene-derived repeating unit, a glass transition temperature and mechanical properties of the propellant may be improved due to a vinyl group of the isoprene-derived repeating unit. For example, when the number of isoprene-derived repeating units is less than an appropriate number, it is good that the glass transition temperature may be lowered, but mechanical properties, especially tensile strength, are lowered, and as a result, a suitable range of vinyl groups need to exist in order to manufacture a propellant having an appropriate glass transition temperature of −70 to −85° C. and excellent tensile strength.

In an embodiment of the present disclosure, the modified conjugated diene based polymer may have a hydroxyl terminal group of the conjugated diene based polymer which is modified with an alkyne terminal group.

The triazole curing system may also be applied to HTPB, a polymer in a hydroxyl-terminated polybutadiene (HTPB)-based solid propellant, which has the highest specific thrust and is widely used. To this end, the hydroxyl group at the terminal of the HTPB needs to be substituted with an azide or alkyne group.

In general, due to the risk of the azide group, a curing system is configured by a polymer substituted with an azide terminal group and a terminal alkyne compound, instead of an azide curing agent in the form of a single molecule.

However, in the case of polybutadiene, since there is a vinyl group (—C═CH$_2$, vinyl or alkene) capable of reacting with azide in the molecule, in the middle of the azide substitution reaction of the terminal hydroxyl group of polybutadiene or after the completion of the reaction, the entanglement of polybutadiene occurs due to an azide-alkene reaction, and thus, there is a problem that the polybutadiene cannot be applied to a propellant.

As a method to solve this problem, there has been studied a method for manufacturing a binder using a triazole group formed by a reaction with a trifunctional azide terminal curing agent after substituting the hydroxyl terminal group of polybutadiene with propiolate, that is, an ester alkyne group instead of an azide group. However, a polymer network in the binder formed by the triazole curing reaction does not have secondary intermolecular attraction, such as hydrogen bonds, in the existing urethane curing system, and as a result, there has been a problem that the mechanical properties of the binder, especially the tensile strength, are not excellent.

To this end, a process has been studied, in which HTPB reacts with 2 equivalents or more of a diisocyanate compound to synthesize polybutadiene terminally modified with isocyanate, and then reacts with an asymmetric compound having alcohol and alkyne groups at both terminals in an equivalent ratio of 1:1 to substitute the terminal of polybutadiene with alkyne capable of cross-linking with an azide curing agent.

However, in a first reaction with HTPB and the isocyanate compound, even if the amount of the isocyanate compound is used in an excess of 2 times or more, since the functional group index of reactants is 2 or more, there was a problem in that the terminal of the polymer could not be completely substituted with isocyanate qualitatively due to step polymerization. In addition, since this reaction continues to be a step polymerization reaction over time, the next reaction needs to be performed at a correct timing each time. In addition, in this case, in order to substitute the terminal of the polymer with an alkyne group, the terminal of the polymer is substituted with an isocyanate group and then reacts with an asymmetric difunctionality, that is, two reactions need to be performed each time. As such, the conventional process has a problem in that the manufacturing process and process control are difficult.

Accordingly, the present disclosure has solved the aforementioned problem by having an urethane group in the molecular chain and cross-linking using the curing agent having an azide terminal group to be described below while modifying the terminal of the conjugated diene polymer of the hydroxyl terminal group to an alkyne group using the chain extender having an alkyne group and an isocyanate group.

Specifically, in the case of the present disclosure, a mono-isocyanate alkyne chain extender may be qualitatively manufactured by an organic chemical reaction with an asymmetric difunctional (hydroxyl group and alkyne) compound capable of reacting with only one isocyanate in the difunctional diisocyanate compound. In addition, the chain extender can be mass-produced through a simple process, and can be used for various polymers at any time using the manufactured chain extender, so that it is very advantageous in terms of processing. That is, there are many advantages compared to the related art in terms of a complete qualitative substitution to alkyne at the terminal of the polymer and processing.

In an embodiment of the present disclosure, the molecular weight of the modified conjugated diene based polymer may be 2,000 g/mol to 10,000 g/mol, 2,500 g/mol to 7,000 g/mol, or 3,000 g/mol to 5,000 g/mol. Within the range, mechanical properties such as elongation, tensile strength, and modulus of elasticity of the propellant may be improved while maintaining the viscosity of the propellant to some extent. For example, when the molecular weight of the modified conjugated diene based polymer is less than 3,000 g/mol, the cross-linking density of the propellant is too high, and thus there is a problem that the propellant does not have elasticity, and when the molecular weight is more than 5,000 g/mol, there is a problem that not only the viscosity of the propellant, but also mechanical properties, particularly, the elongation may be deteriorated.

In an embodiment of the present disclosure, the chain extender-derived part may be formed from a chain extender having an alkyne group at one terminal and an isocyanate group at the other terminal. In this case, the isocyanate group of the chain extender may react and bond with hydroxyl groups at both terminals of the conjugated diene based monomer-based repeating unit to form a chain extender-derived part.

In an embodiment of the present disclosure, the chain extender-derived part may include one or more urethane groups in the chain, and as a specific example, the chain extender-derived part may include two or more urethane groups. As such, the chain extender-derived part of introducing a urethane group capable of secondary bonding such as hydrogen bonds before the curing reaction in the molecular chain is included, thereby improving mechanical properties when the modified conjugated diene based polymer is used as a binder for a solid propellant.

In an embodiment of the present disclosure, at least one of carbon and hydrogen in the molecular chain of the chain extender-derived part may be unsubstituted or substituted with O.

In an embodiment of the present disclosure, the chain extender-derived part may include an aliphatic hydrocarbon chain. In this case, it is possible to improve the modulus of elasticity by improving mechanical properties, particularly, tensile strength compared to the case of including an aromatic hydrocarbon chain.

In an embodiment of the present disclosure, the modified conjugated diene based polymer may be represented by the following Chemical Formula 1.

[Chemical Formula 1]

In Chemical Formula 1, $R_1$ is an alkylene group having 1 to 20 carbon atoms or an alkenylene group having 2 to 20 carbon atoms, and $R_2$ is an alkylene group having 1 to 20 carbon atoms, an alkenylene group having 2 to 20 carbon atoms, an isophorone moiety or a toluene moiety. As a specific example, in Chemical Formula 1, $R_1$ may be an alkylene group having 1 to 10 carbon atoms, $R_2$ may be an alkylene group having 1 to 10 carbon atoms, an isophorone moiety or a toluene moiety. As a more specific example, $R_1$ may be an alkylene group having 1 to 4 carbon atoms, and $R_2$ may be an alkylene group having 1 to 6 carbon atoms, an isophorone moiety or a toluene moiety.

According to the present disclosure, there is provided a manufacturing method of a modified conjugated diene based polymer comprising steps of: preparing a chain extender which includes one or more urethane groups in a molecular chain and has different functional groups at both terminals, wherein one of the functional groups is an alkyne group (S10); and substituting a terminal of the conjugated diene based polymer with an alkyne group by reacting the chain extender prepared in step S10 with the conjugated diene based polymer including a conjugated diene based monomer-derived repeating unit and having hydroxyl groups at both terminals (S20).

In an embodiment of the present disclosure, the hydroxyl terminal group of the conjugated diene based polymer was substituted with an alkyne group instead of an azide group, and in order to increase the reactivity of the alkyne group to the azide group, the hydroxyl terminal group was substituted with an ester group, that is, a propiolate group, which is an electron withdrawing group right next to the alkyne group.

In an embodiment of the present disclosure, one terminal of the chain extender prepared in step S10 may be an alkyne group, and the other terminal thereof may be an isocyanate group.

As a specific example, the chain extender may be represented by the following Chemical Formula 2.

[Chemical Formula 2]

In Chemical Formula 2, $R_1$ is an alkylene group having 1 to 20 carbon atoms or an alkenylene group having 2 to 20 carbon atoms, and $R_2$ is an alkylene group having 1 to 20 carbon atoms, an alkenylene group having 2 to 20 carbon atoms, an isophorone moiety or a toluene moiety. As a specific example, in Chemical Formula 2, $R_1$ may be an alkylene group having 1 to 10 carbon atoms, $R_2$ may be an alkylene group having 1 to 10 carbon atoms, an isophorone moiety or a toluene moiety. As a more specific example, $R_1$ may be an alkylene group having 1 to 4 carbon atoms, and $R_2$ may be an alkylene group having 1 to 6 carbon atoms, an isophorone moiety or a toluene moiety.

In an embodiment of the present disclosure, in step S10, the chain extender represented by Chemical Formula 2 may be prepared by reacting an asymmetric propiolate compound having an alcohol group and an alkyne group at both terminals, respectively, with a diisocyanate compound.

The propiolate compound may be hydroxy alkyl propiolate, and may include, for example, at least one selected from the group consisting of 2-hydroxy ethyl propiolate and 4-hydroxy butyl propiolate, but is not limited thereto. As a specific example, the propiolate compound may be 4-hydroxy butyl propiolate.

The diisocyanate compound may include, for example, at least one selected from the group consisting of toluene diisocyanate, hexamethylene diisocyanate, and isophorone diisocyanate, but is not limited thereto.

In an embodiment of the present disclosure, the reaction temperature of step S10 may be 25° C. to 50° C., 25° C. to 45° C., or 30° C. to 40° C. When performing step S10 within the range, the chain extender of the present disclosure may be easily prepared by appropriately controlling the reaction rate between the propiolate compound and the isocyanate group compound.

In an embodiment of the present disclosure, in step S20, the hydroxyl groups at both terminals of the conjugated diene based polymer and the isocyanate group of the chain extender may be urethane-bonded to each other.

In an embodiment of the present disclosure, the reaction temperature of step S20 may be 30° C. to 80° C., 40° C. to 65° C., or 45° C. to 55° C. When performing step S20 within the range, the modified conjugated diene based polymer according to the present disclosure may be easily completed by reacting the chain extender with the conjugated diene based polymer.

In an embodiment of the present disclosure, each of steps S10 and S20 may be performed in the presence of a catalyst. The catalyst may include, for example, at least one selected from the group consisting of manganese acetylacetonate, iron acetylacetonate, dibutyltin dilaurate and copper(II) acetylacetonate.

In an embodiment of the present disclosure, the modified conjugated diene based polymer manufactured through step S20 may be represented by the following Chemical Formula 1. In this case, the detailed description of the modified conjugated diene based polymer of Chemical Formula 1 may be the same as described above.

According to the present disclosure, there is provided a modified conjugated diene based binder composition for a solid propellant including the modified conjugated diene based polymer according to the present disclosure; and a curing agent having azide groups at one or more terminals.

In an embodiment of the present disclosure, the curing agent may have azide groups at 1 to 5, 2 to 4, or 3 terminals. As a specific example, the curing agent may have azide groups at three terminals.

The curing agent may provide a triazole curing system in which the molecular chain of the modified conjugated diene based polymer is cross-linked with a triazole group rather than a urethane group, and cross-links the molecular chain with such a triazole group during the cross-linking reaction, thereby improving the mechanical properties of the binder and increasing the energy of the binder.

In an embodiment of the present disclosure, the curing agent may include at least one selected from the group consisting of compounds represented by the following Chemical Formulas 3 and 4. Specifically, in the case of a conventional single-molecule azide group, there was a problem in that the sensitivity to impact and friction was high. However, in the present disclosure, the molecular weight of the azide group is slightly increased to suppress this problem as much as possible, so that the azide group content in the molecule was lowered as much as possible.

[Chemical Formula 3]

[Chemical Formula 4]

In Chemical Formula 3, $R_3$ to $R_5$ are each independently an alkylene group having 1 to 20 carbon atoms, an alkenylene group having 2 to 20 carbon atoms, a cycloalkylene group having 3 to 20 carbon atoms, an arylene group having 6 to 20 carbon atoms, or —R—O—R— (R is an alkylene group having 1 to 20 carbon atoms or an alkenylene group having 2 to 20 carbon atoms), and in Chemical Formula 4, $X_1$ to $X_3$ are each independently O or S, and $R_5$ to $R_9$ are each independently an alkylene group having 1 to 20 carbon atoms, an alkenylene group having 2 to 20 carbon atoms, and a cycloalkylene group having 3 to 20 carbon atoms, or an arylene group having 6 to 20 carbon atoms.

In the case of using the aliphatic compound curing agent as shown in Chemical Formula 3, elongation may be increased, and in the case of using the aromatic compound curing agent as shown in Chemical Formula 4, while the flexibility of the network molecular structure in the cross-linked binder is reduced, the elongation is lowered, and the tensile strength may be improved.

In addition, in the case of using the aromatic compound curing agent as shown in Chemical Formula 4, the gelation time of the binder, that is, the reactivity may be improved.

In an embodiment of the present disclosure, in Chemical Formula 3, $R_3$ to $R_5$ may be an alkylene group having 1 to 10 carbon atoms or —R—O—R— (R is an alkylene group having 1 to 10 carbon atoms), and in Chemical Formula 4, $X_1$ to $X_3$ may be O, and $R_6$ to $R_8$ may be an alkylene group having 1 to 10 carbon atoms.

In an embodiment of the present disclosure, in Chemical Formula 3, $R_3$ to $R_5$ may be an alkylene group having 1 to 3 carbon atoms or —R—O—R— (R is an alkylene group having 1 to 3 carbon atoms), and in Chemical Formula 4, $X_1$ to $X_3$ may be O, and $R_6$ to $R_8$ may be an alkylene group having 1 to 5 carbon atoms.

In an embodiment of the present disclosure, in Chemical Formula 3, $R_3$ to $R_5$ may be methylene, and in Chemical Formula 4, $X_1$ to $X_3$ may be O, and $R_6$ to $R_8$ may be ethylene.

In an embodiment of the present disclosure, the curing agent may be a compound represented by the following Chemical Formula 4-1.

[Chemical Formula 4-1]

In an embodiment of the present disclosure, the modified conjugated diene based binder composition for the solid propellant may include 85 wt % to 99 wt % of the modified conjugated diene based polymer, and 1 wt % to 15 wt % of the curing agent. For example, the modified conjugated diene based binder composition for the solid propellant may include 90 wt % to 99 wt % or 92 wt % to 97 wt % of the modified conjugated diene based polymer, and 1 wt % to 10 wt % or 3 wt % to 8 wt % of the curing agent.

When the binder composition consists of the modified conjugated diene based polymer modified with the chain extender and the curing agent within the range, curing by a triazole group occurs in a subsequent cross-linking reaction, and the binder prepared as such has a urethane group in the molecular chain and has an excellent viscoelastic property.

In an embodiment of the present disclosure, the modified conjugated diene based binder composition for the solid propellant may consist of a modified conjugated diene based polymer represented by the following Chemical Formula 1 and a curing agent represented by the following Chemical Formula 3.

[Chemical Formula 1]

[Chemical Formula 3]

In Chemical Formula 1 above, R₁ is an alkylene group having 1 to 4 carbon atoms, and R₂ is an alkylene group having 1 to 6 carbon atoms, a toluene moiety or an isophorone moiety, and in Chemical Formula 3 above, R₃ to R₅ are methylene.

In this case, by using the aliphatic compound as shown in Chemical Formula 3 as the curing agent, the elongation of the cured binder may be improved compared to the case of using the aromatic compound as shown in Chemical Formula 4 as the curing agent.

In an embodiment of the present disclosure, the modified conjugated diene based binder composition for the solid propellant may consist of a modified conjugated diene based polymer represented by the following Chemical Formula 1 and a curing agent represented by the following Chemical Formula 4-1.

1,3-propanediol trinitrate (TMETN), triethyleneglycol dinitrate (TEGDN), n-butyl-nitratoethyl nitramine (BuNENA) and diphenylamine (DPA).

As a specific example, the plasticizer may be dioctyl sebacate (DOS), dioctyl adipate (DOA) or isodecyl pelagonate (IDP), and as a more specific example, the plasticizer may be dioctyl adipate.

In an embodiment of the present disclosure, the modified conjugated diene based binder composition for the solid propellant may include 60 wt % to 85 wt % of the modified conjugated diene based polymer, 2 wt % to 10 wt % of the curing agent, and 10 wt % to 35 wt % of the plasticizer. For example, the modified conjugated diene based binder composition for the solid propellant may include 68 wt % to 83 wt % or 65 wt % to 80 wt % of the modified conjugated

[Chemical Formula 1]

[Chemical Formula 4-1]

In Chemical Formula 1, R₁ is an alkylene group having 1 to 4 carbon atoms, and R₂ is an alkylene group having 1 to 6 carbon atoms, a toluene moiety or an isophorone moiety.

In this case, by using the aromatic compound as shown in Chemical Formula 4 as the curing agent, the tensile strength of the cured binder may be improved compared to the case of using the aliphatic compound as shown in Chemical Formula 3 as the curing agent.

In an embodiment of the present disclosure, the modified conjugated diene based binder composition for the solid propellant may further include a plasticizer.

The plasticizer may include, for example, at least one selected from the group consisting of dioctyl sebacate (DOS), dioctyl adipate (DOA), isodecyl pelargonate (IDP), nitroglycerin (NG), 1,2,4-butanetriol trinitrate (BTTN), diethylene glycol dinitrate (DEGDN), 2-methyl-2-methyloldiene based polymer, 2 wt % to 8 wt % or 3 wt % to 6 wt % of the curing agent, and 13 wt % to 33 wt % or 15 wt % to 33 wt % of the plasticizer.

When the binder composition consists of the modified conjugated diene based polymer modified with the chain extender and the curing agent within the range, curing by a triazole group occurs in a subsequent cross-linking reaction, and the binder prepared as such has a urethane group in the molecular chain and has an excellent viscoelastic property, and furthermore, the thermal properties may be improved.

In an embodiment of the present disclosure, the modified conjugated diene based binder composition for the solid propellant may consist of a modified conjugated diene based polymer represented by the following Chemical Formula 1, a curing agent represented by the following Chemical Formula 3, and dioctyl adipate.

[Chemical Formula 1]

[Chemical Formula 3]

In Chemical Formula 1 above, $R_1$ is an alkylene group having 1 to 4 carbon atoms, and $R_2$ is an alkylene group having 1 to 6 carbon atoms, a toluene moiety or an isophorone moiety.

In this case, by using the aliphatic compound as shown in Chemical Formula 3 as the curing agent, the elongation of the cured binder may be improved and the thermal properties may be improved compared to the case of using the aromatic compound as shown in Chemical Formula 4 as the curing agent.

In an embodiment of the present disclosure, the modified conjugated diene based binder composition for the solid propellant may consist of a modified conjugated diene based polymer represented by the following Chemical Formula 1, a curing agent represented by the following Chemical Formula 4-1, and dioctyl adipate.

lant in which the modified conjugated diene based polymer according to the present disclosure and a curing agent having azide groups at one or more terminals are cross-linked by a triazole-forming reaction.

Specifically, when the binder composition including the modified conjugated diene based polymer and the curing agent is cross-linked under specific conditions, the alkyne group of the modified conjugated diene based polymer and the azide group at the terminal of the curing agent form a polymer network cross-linked with a triazole group by Huisgen azide-alkyne cycloaddition reaction (AAC) to provide a binder cured with a triazole group having excellent viscoelastic properties and high energy.

In an embodiment of the present disclosure, the modified conjugated diene-based polymer and the curing agent having azide groups at one or more terminals are cross-linked by the

[Chemical Formula 1]

[Chemical Formula 4-1]

In Chemical Formula 1, $R_1$ is an alkylene group having 1 to 4 carbon atoms, and $R_2$ is an alkylene group having 1 to 6 carbon atoms, a toluene moiety or an isophorone moiety.

In this case, by using the aromatic compound as shown in Chemical Formula 4 as the curing agent, the tensile strength of the cured binder may be improved and the thermal properties may be improved compared to the case of using the aliphatic compound as shown in Chemical Formula 3 as the curing agent. In addition, since the curing agent of Chemical Formula 4 has a faster reaction rate than the curing agent of Chemical Formula 3, the reaction rate of the curing agent of Chemical Formula 4 is somewhat lowered in the presence of the plasticizer to reduce the curing rate of the binder, thereby finally increasing a pot-life.

According to the present disclosure, there is provided a modified conjugated diene based binder for a solid propeltriazole-forming reaction to form a main chain, and the main chain may include a plasticizer-derived unit.

Specifically, when the binder composition including the modified conjugated diene based polymer, the curing agent and the plasticizer is cross-linked under specific conditions, a main chain having a polymer network cross-linked with a triazole group is formed, and the main chain may include a plasticizer-derived unit. As such, the binder cured with the triazole group may have improved viscoelastic properties, high energy, and improved thermal properties.

In an embodiment of the present disclosure, specific descriptions of the types, the contents, etc. of the modified conjugated diene based polymer, the curing agent and the plasticizer may be the same as described above.

According to the present disclosure, there is provided a manufacturing method of a modified conjugated diene based binder for a solid propellant including preparing a binder composition by mixing the modified conjugated diene based polymer according to the present disclosure and a curing agent having azide groups at one or more terminals (S100); and cross-linking the binder composition (S200).

In an embodiment of the present disclosure, in the preparing of the binder composition (S100), a plasticizer may be further added.

In an embodiment of the present disclosure, specific descriptions of the types, the contents, etc. of the modified conjugated diene based polymer, the curing agent and the plasticizer may be the same as described above.

In an embodiment of the present disclosure, in step S200, the cross-linking reaction may be performed without an additional solvent or catalyst, thereby reducing utility costs.

In an embodiment of the present disclosure, the cross-linking of the binder composition (S200) may be performed at a temperature of 50° C. to 90° C., 60° C. to 85° C., or 65° C. to 80° C. When the binder composition is cross-linked in the temperature range, the reaction rate is appropriately adjusted to prevent a decrease in productivity due to an increase in propellant curing time when a propellant is applied in the future, and the pot-life of the propellant is increased to improve the productivity.

In an embodiment of the present disclosure, the cross-linking reaction time in the temperature range may be appropriately adjusted.

Hereinafter, the present disclosure will be described in detail with reference to Examples for specific description. However, Examples according to the present disclosure may be modified in various forms, and it is not interpreted that the scope of the present disclosure is limited to the following Examples. Examples of the present disclosure will be provided for more completely explaining the present disclosure to those skilled in the art.

EXAMPLES

Example 1

1. Preparation of Chain Extender 0.2 g of dibutyltin dilaurate as a catalyst was added to 4-hydroxy butyl propiolate (20 g, 0.1407 mol) and then slowly added dropwise in isophorone diisocyanate (31.247 g, 0.1407 mol) in a round-bottom flask at 30 to 40° C., and the reaction started.

Figure 5:
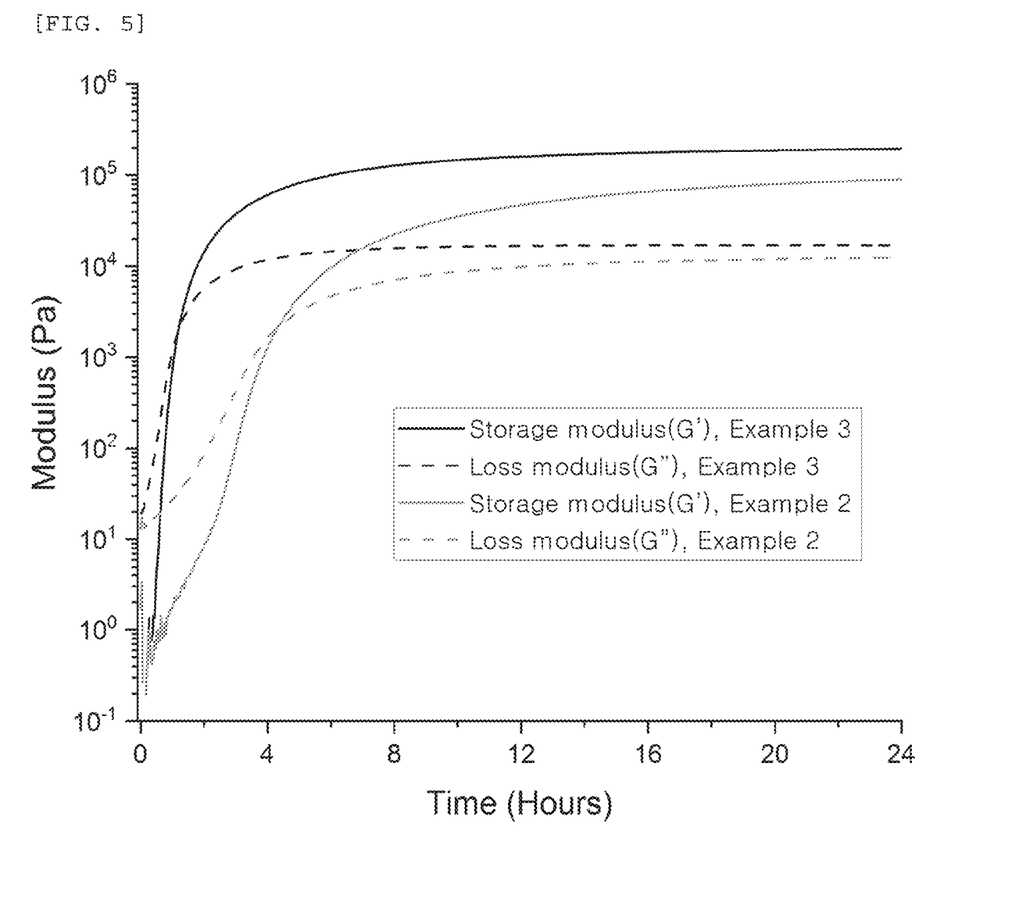
FIG. 5 is a graph showing changes in modulus by time according to a type of curing agent of a modified conjugated diene based polymer-based binder in an embodiment of the present disclosure.

As shown in FIG. 5 below, in the reaction termination, the reaction was performed until the concentration of an isocyanate peak of 2,250 $cm^{-1}$ in FT-IR was reduced to half. A change in the isocyanate peak concentration was confirmed through an isocyanate peak area change rate of 2,250 $cm^{-1}$ compared to an alkyne peak area of 2,100 $cm^{-1}$ to determine whether the reaction was terminated, and then a chain extender represented by the following Chemical Formula 2 was finally quantitatively obtained.

[Chemical Formula 2]

In Chemical Formula 2, $R_1$ was butylene, and $R_2$ was an isophorone moiety.

2. Manufacture of Modified Conjugated Diene Based Polymer

Figure 1:
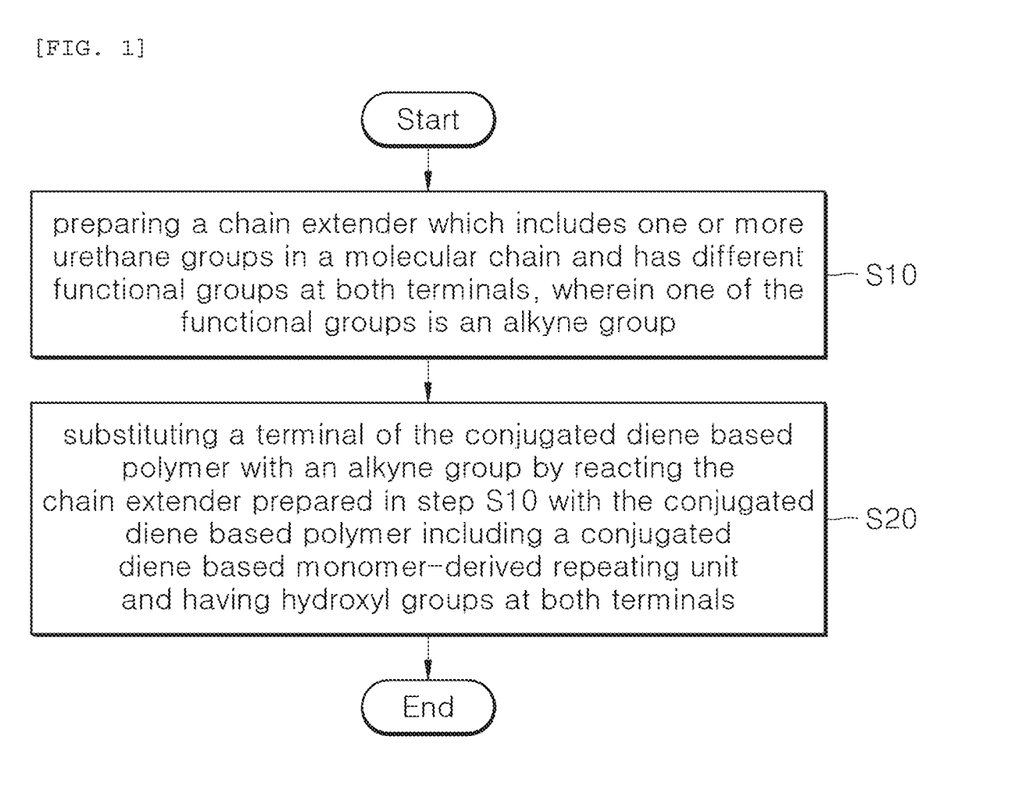
FIG. 1 is a flowchart illustrating a manufacturing method of a modified conjugated diene based polymer in an embodiment of the present disclosure.
Figure 2:
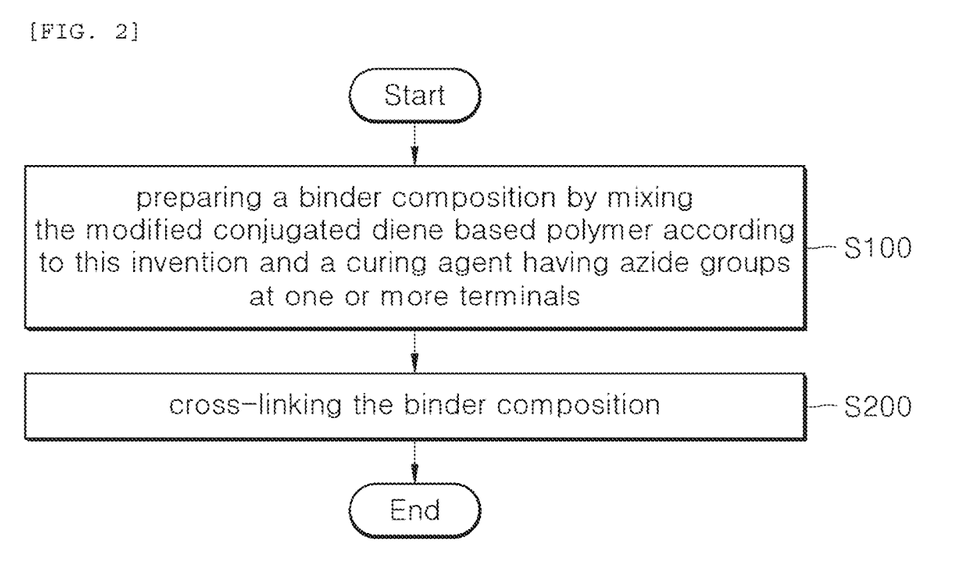
FIG. 2 is a flowchart illustrating a manufacturing method of a modified conjugated diene based binder for a solid propellant in an embodiment of the present disclosure.
Figure 3:
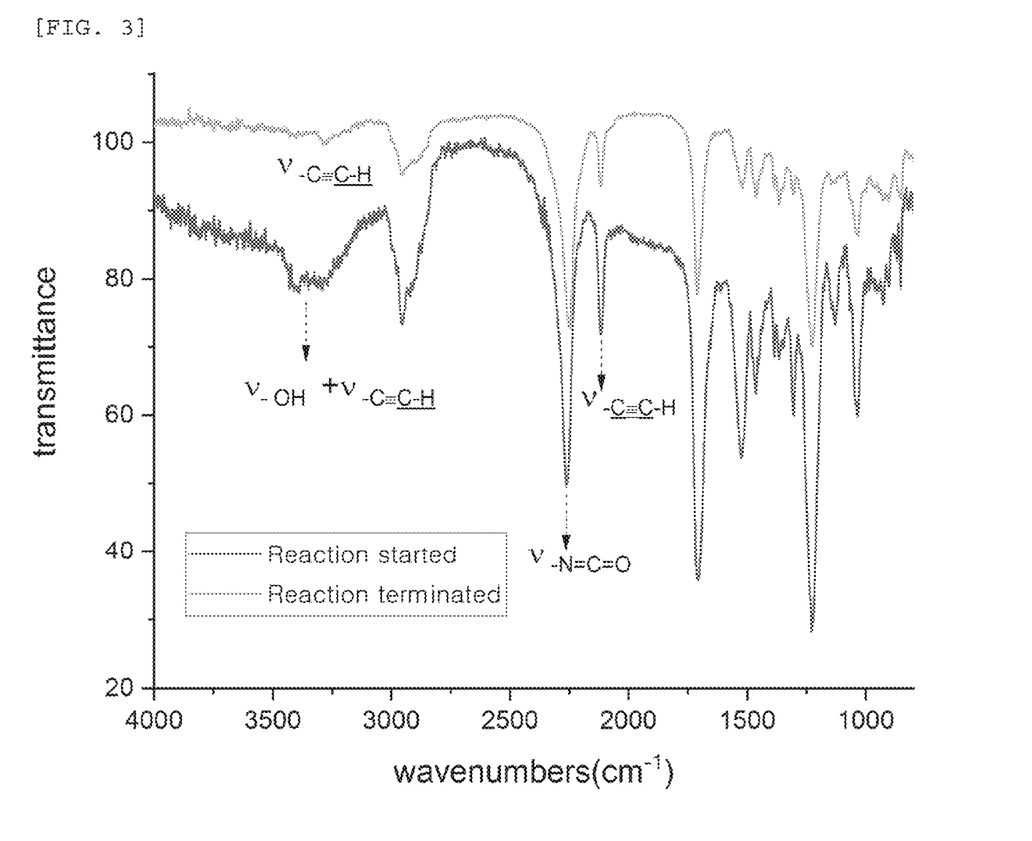
FIG. 3 is an FT-IR spectrum immediately after a synthesis reaction of a chain extender and immediately before termination in an embodiment of the present disclosure.
Figure 4:
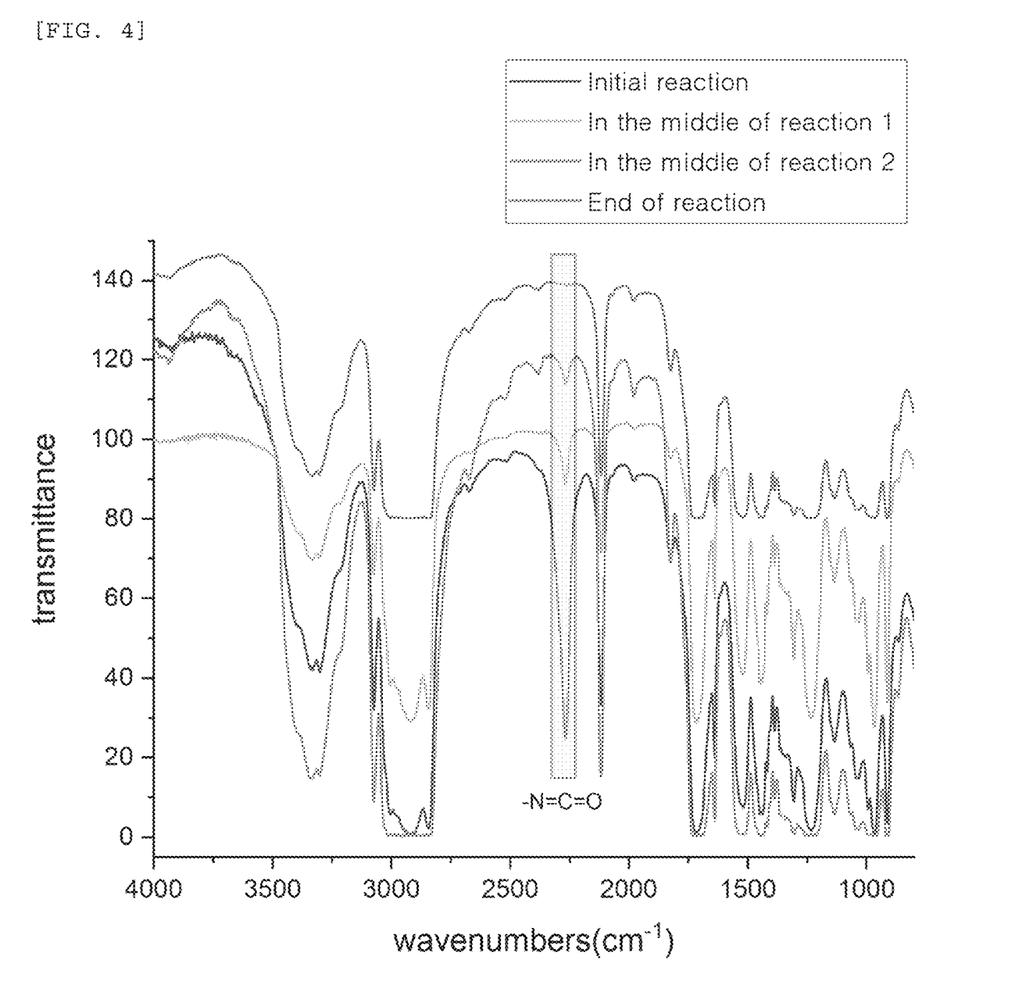
FIG. 4 is an FT-IR spectrum according to a reaction time between a conjugated diene based polymer and a chain extender in an embodiment of the present disclosure.

The chain extender reacted with polybutadiene (HTPB, manufacturer: Atochem, product name R-45M) including a 1,3-butadiene-derived repeating unit and an isoprene-derived repeating unit in a polymer chain and having hydroxyl groups at both terminals in a 1:1 equivalent ratio, at 50° C. under 0.2 mass fraction of dibutyltin dilaurate. Thereafter, by measuring FT-IR for each time period, the reaction proceeded until the isocyanate peak at 2250 $cm^{-1}$ disappeared as shown in FIG. 4 below to quantitatively synthesize alkyne urethane terminated polybutadiene (AUTPB) as a modified conjugated diene based polymer having the structure of the following Chemical Formula 1.

3. Manufacture of Modified Conjugated Diene Based Binder

A binder composition mixed with 79.6 wt % of the synthesized alkyne urethane terminated polybutadiene (AUTPB), 3.4 wt % of the curing agent in which $R_3$ to $R_5$ were methylene (—$CH_2$—) in Chemical Formula 3, and 17 wt % of a dioctyl adipate (DOA) plasticizer was cross-linked at 70° C. using FT-IR until a rate of change of an alkyne/azide peak (2100 $cm^{-1}$) and a rate of change of the storage/loss modulus of a rheometer did not appear to manufacture a modified conjugated diene based binder according to the present disclosure.

Example 2

A binder composition mixed with 66.9 wt % of the alkyne urethane terminated polybutadiene (AUTPB) synthesized in Example 1, 3.1 wt % of the curing agent in which $R_3$ to $R_5$ were methylene (—$CH_2$—) in Chemical Formula 3, and 30 wt % of the dioctyl adipate (DOA) plasticizer was cross-linked at 70° C. using FT-IR until a rate of change of an alkyne/azide peak (2100 $cm^{-1}$) and a rate of change of the storage/loss modulus of a rheometer did not appear to manufacture a modified conjugated diene based binder according to the present disclosure.

Example 3

A binder composition mixed with 65.2 wt % of the alkyne urethane terminated polybutadiene (AUTPB) synthesized in Example 1, 4.8 wt % of the curing agent of Chemical Formula 4-1, and 30 wt % of the dioctyl adipate (DOA) plasticizer was cross-linked at 70° C. using FT-IR until a rate of change of an alkyne/azide peak (2100 $cm^{-1}$) and a rate of change of the storage/loss modulus of a rheometer did not appear to manufacture a modified conjugated diene based binder according to the present disclosure.

Comparative Example

Comparative Example 1

Polybutadiene (HTPB, manufacturer: Atochem, product name R-45M) including a 1,3-butadiene-derived repeating unit and an isoprene-derived repeating unit in a polymer chain and having hydroxyl groups at both terminals was dissolved in 1 L of benzene, propiolic acid (7.5 g, 107.1 mmol) and p-toluene sulfonic acid (0.005 mol) were added and refluxed, water extracted during the reaction was removed using a Dean-stark trap, and then the mixture was neutralized with a sodium bicarbonate ($NaHCO_3$) solution, washed with methylene chloride, and dried slowly under vacuum to obtain polybutadiene (AKPB) modified with alkyne groups at both terminals with a yield of about 90% or more.

2. Manufacture of Modified Conjugated Diene Based Binder

A binder composition mixed with 95.1 wt % of the synthesized polybutadiene (AKPB) modified with alkyne groups at both terminals and 4.9 wt % of the curing agent in which $R_3$ to $R_5$ were methylene (—$CH_2$—) in Chemical Formula 3 was cross-linked at 70° C. using FT-IR until a rate of change of an alkyne/azide peak (2100 cm$^{-1}$) and a rate of change of the storage/loss modulus of a rheometer did not appear to manufacture a modified conjugated diene based binder according to the present disclosure.

Experimental Examples

Experimental Example 1

The mechanical properties and thermal properties of the binders manufactured in Examples 1 to 3 and Comparative Example 1 were measured and shown in Table 1 below.

TABLE 1

| Classification | Elongation (%) | Tensile strength (MPa) | Modulus of elasticity (MPa) | Hardness (Shore A2) | Glass transition temperature (° C.) | Gel point (hr) |
|---|---|---|---|---|---|---|
| Comparative Example 1 | 211 | 0.4 | 0.28 | 19 | −76 | 22 |
| Example 1 | 321 | 2.2 | 0.8 | 38 | −82 | — |
| Example 2 | 298 | 0.9 | 0.4 | 22 | −89 | 4.3 |
| Example 3 | 236 | 1.1 | 0.7 | 37 | −88 | 1.2 |

In Table 1, the gel point is a result of measuring an intersection point of diagrams of a loss modulus and a storage modulus with time under an isothermal condition of 70° C. using a rheometer. In this case, the storage/loss modulus according to time in each of Examples 2 and 3 may be confirmed in FIG. 5 below.

Referring to Table 1, it can be seen that a difference in glass transition temperature between Comparative Example 1 and Examples 1 to 3 is large.

Specifically, in the case of Examples 1 to 3, the low-temperature characteristics were excellent due to the application of the plasticizer in the binder. However, above all, despite the application of the plasticizer in the binder, Examples 1 to 3 showed significantly higher mechanical properties, particularly, tensile strength, than those of Comparative Example 1, and thus, it was confirmed that the modulus of elasticity was very good.

In addition, effects of the molecular structure of the curing agent on the mechanical properties of the binder as well as the reaction rate and thermal properties were confirmed. The binder of Example 3 to which the aromatic azide curing agent was applied had a lot of rigid parts in the network due to the characteristics of the molecular structure compared to Example 2 to which the aliphatic azide curing agent containing the same amount of plasticizer was applied, so that the elongation was low, but the tensile strength and the modulus of elasticity were excellent. As a result, the glass transition temperature was slightly low, and the curing reaction proceeded much faster.

So far, the specific embodiments of the modified conjugated diene based polymer according to an embodiment of the present disclosure, the manufacturing method thereof, the binder composition for the solid propellant comprising the same, the modified conjugated diene based binder for the solid propellant, and the manufacturing method thereof have been described, but it will be apparent that various modifications can be made without departing from the scope of the present disclosure.

Therefore, the scope of the present disclosure should not be limited to the exemplary embodiments and should be defined by the appended claims and equivalents to the appended claims.

In other words, the exemplary embodiments described above are illustrative in all aspects and should be understood as not being restrictive, and the scope of the present disclosure is represented by appended claims to be described below rather than the detailed description, and it is to be interpreted that the meaning and scope of the appended claims and all changed or modified forms derived from the equivalents thereof are included within the scope of the present disclosure.

What is claimed is:

1. A modified conjugated diene based polymer comprising:
   a conjugated diene based monomer-derived repeating unit; and
   a chain extender-derived part which is linked to both terminals of the conjugated diene based monomer-derived repeating unit, respectively, includes one or more urethane groups in a molecular chain, and has different functional groups at both terminals, wherein one of the functional groups is an alkyne group,
   wherein a terminal of the chain extender-derived part which is not linked to both terminals of the conjugated diene based monomer-derived repeating unit is an alkyne group,
   wherein the chain extender-derived part is formed from a chain extender having an alkyne group at one terminal and an isocyanate group at the other terminal, and bonded to the isocyanate group of the chain extender by reacting with hydroxyl groups at both terminals of the conjugated diene based monomer-derived repeating unit.

2. The modified conjugated diene based polymer of claim 1, wherein the conjugated diene based monomer includes at least one selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene.

3. A modified conjugated diene based binder composition for a solid propellant comprising:
   the modified conjugated diene based polymer according to claim 1; and
   a curing agent having azide groups at one or more terminals.

4. The modified conjugated diene based binder composition for the solid propellant of claim 3, wherein the curing agent has azide groups at three terminals.

5. The modified conjugated diene based binder composition for the solid propellant of claim 3, wherein the curing agent includes at least one selected from the group consisting of compounds represented by the following Chemical Formulas 3 and 4:

[Chemical Formula 3]

-continued

[Chemical Formula 4]

in Chemical Formula 3, $R_3$ to $R_5$ are each independently an alkylene group having 1 to 20 carbon atoms, an alkenylene group having 2 to 20 carbon atoms, a cycloalkylene group having 3 to 20 carbon atoms, an arylene group having 6 to 20 carbon atoms, or —R—O—R— (R is an alkylene group having 1 to 20 carbon atoms or an alkenylene group having 2 to 20 carbon atoms), and in Chemical Formula 4, $X_1$ to $X_3$ are each independently O or S, and $R_6$ to $R_8$ are each independently an alkylene group having 1 to 20 carbon atoms, an alkenylene group having 2 to 20 carbon atoms, a cycloalkylene group having 3 to 20 carbon atoms, or an arylene group having 6 to 20 carbon atoms.

6. The modified conjugated diene based binder composition for the solid propellant of claim 5, wherein in Chemical Formula 3, $R_3$ to $R_5$ are an alkylene group having 1 to 3 carbon atoms or —R—O—R— (R is an alkylene group having 1 to 3 carbon atoms), and in Chemical Formula 4, $X_1$ to $X_3$ are O, and $R_6$ to $R_8$ are an alkylene group having 1 to 5 carbon atoms.

7. The modified conjugated diene based binder composition for the solid propellant of claim 3, further comprising:
a plasticizer,
wherein the plasticizer includes at least one selected from the group consisting of dioctyl sebacate (DOS), dioctyl adipate (DOA), isodecyl pelargonate (IDP), nitroglycerin (NG), 1,2,4-butanetriol trinitrate (BTTN), diethylene glycol dinitrate (DEGDN), 2-methyl-2-methylol-1,3-propanediol trinitrate (TMETN), triethyleneglycol dinitrate (TEGDN), n-butyl-nitratoethyl nitramine (BuNENA) and diphenylamine (DPA).

8. The modified conjugated diene based binder composition for the solid propellant of claim 7, wherein the binder composition includes 60 wt % to 85 wt % of the modified conjugated diene based polymer,
2 wt % to 10 wt % of the curing agent, and
10 wt % to 35 wt % of the plasticizer.

9. A modified conjugated diene based binder for a solid propellant in which the modified conjugated diene based polymer according to claim 1 and a curing agent having azide groups at one or more terminals are cross-linked by a triazole-forming reaction.

10. The modified conjugated diene based binder for the solid propellant of claim 9, wherein the modified conjugated diene based polymer and the curing agent having azide groups at one or more terminals are cross-linked by the triazole-forming reaction to form a main chain, and
the main chain includes a plasticizer-derived unit.

11. A manufacturing method of a modified conjugated diene based binder for a solid propellant comprising steps of:
preparing a binder composition by mixing the modified conjugated diene based polymer according to claim 1 and a curing agent having azide groups at one or more terminals; and
cross-linking the binder composition.

* * * * *